United States Patent
Koteich et al.

(10) Patent No.: US 10,644,631 B2
(45) Date of Patent: May 5, 2020

(54) METHOD FOR ESTIMATING THE POSITION AND SPEED OF THE ROTOR OF AN ALTERNATING CURRENT MACHINE FOR A MOTOR VEHICLE, AND CORRESPONDING SYSTEM

(71) Applicants: RENAULT S.A.S., Boulogne-Billancourt (FR); NISSAN MOTOR CO., LTD., Yokohama-Shi (JP)

(72) Inventors: Mohamad Koteich, Bures Sur Yvette (FR); Abdelmalek Maloum, Chevilly la rue (FR)

(73) Assignees: RENAULT S.A.S., Boulogne-Billancourt (FR); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 16/311,945

(22) PCT Filed: Jun. 20, 2017

(86) PCT No.: PCT/FR2017/051635
§ 371 (c)(1),
(2) Date: Dec. 20, 2018

(87) PCT Pub. No.: WO2017/220924
PCT Pub. Date: Dec. 28, 2018

(65) Prior Publication Data
US 2019/0181788 A1  Jun. 13, 2019

(30) Foreign Application Priority Data
Jun. 22, 2016 (FR) ...................... 16 55822

(51) Int. Cl.
*H02P 21/18* (2016.01)
*H02P 21/28* (2016.01)
(Continued)

(52) U.S. Cl.
CPC .......... *H02P 21/18* (2016.02); *H02P 21/0003* (2013.01); *H02P 21/12* (2013.01);
(Continued)

(58) Field of Classification Search
CPC ...... H02P 1/00; H02P 1/04; H02P 1/46; H02P 1/465; H02P 1/24; H02P 3/00; H02P 3/18;
(Continued)

(56) References Cited

U.S. PATENT DOCUMENTS

| 6,069,467 A | * | 5/2000 | Jansen | ............... H02P 6/183 318/801 |
| 7,098,623 B2 | * | 8/2006 | Piippo | ............... H02P 21/141 318/701 |

(Continued)

FOREIGN PATENT DOCUMENTS

| CN | 102437813 B | 4/2014 |
| CN | 102983806 B | 2/2015 |

(Continued)

OTHER PUBLICATIONS

International Search Report dated Oct. 11, 2017 in PCT/FR2017/051635 filed on Jun. 20, 2017.
(Continued)

*Primary Examiner* — Antony M Paul
(74) *Attorney, Agent, or Firm* — Oblon, McClelland, Maier & Neustadt, L.L.P.

(57) ABSTRACT

A method estimating position and speed of a rotor of an alternating current machine for a motor vehicle. The method: determines stator currents in a three-phase refer-
(Continued)

Figure 1:
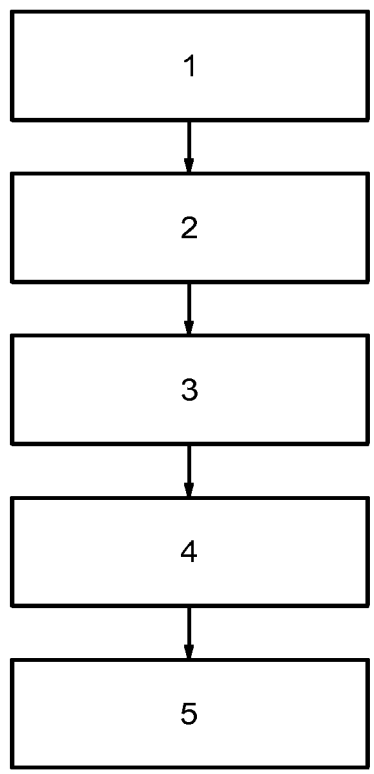

ence frame and values of stator voltages of the machine in the three-phase reference frame; determines components of the stator currents in a two-phase reference frame depending on the stator currents in the three-phase reference frame by Concordia transformation; determines components of the stator voltages in the two-phase reference frame depending on the stator voltages in the three-phase reference frame by Concordia transformation; iteratively determines rotor speed depending on the stator voltages in the two-phase reference frame and adjustment parameters; determines stator fluxes of the machine in the two-phase reference frame depending on the rotor speed and rejection parameters; and determines rotor position depending on the stator fluxes in the two-phase reference frame, the stator currents in the two-phase reference frame, and equivalent inductance.

10 Claims, 2 Drawing Sheets

(51) Int. Cl.
*H02P 21/00* (2016.01)
*H02P 21/20* (2016.01)
*H02P 21/22* (2016.01)
*H02P 21/12* (2016.01)

(52) U.S. Cl.
CPC .............. *H02P 21/20* (2016.02); *H02P 21/22* (2016.02); *H02P 21/28* (2016.02)

(58) Field of Classification Search
CPC ...... H02P 6/00; H02P 6/04; H02P 6/08; H02P 21/00; H02P 23/00; H02P 25/00; H02P 27/00; H02P 27/04; H02P 6/12; H02P 6/14; H02P 23/12; H02P 2203/11; H02P 6/185; H02P 2203/03; G05B 11/28; G11B 20/24; H02H 7/08; H02K 29/10; H02K 29/06; G01R 31/02
USPC .... 318/400.01, 400.02, 400.14, 400.15, 700, 318/701, 721, 727, 779, 799, 800, 801, 318/430, 432, 490, 400.21, 400.22, 318/400.32, 805
See application file for complete search history.

(56) References Cited

U.S. PATENT DOCUMENTS

| | | | |
|---|---|---|---|
| 7,423,406 B2* | 9/2008 | Geniusz | H02P 23/07 318/800 |
| 9,441,943 B2* | 9/2016 | Dib | G01B 7/30 |
| 2007/0194742 A1 | 8/2007 | Markunas | |
| 2013/0289934 A1 | 10/2013 | Bazzi et al. | |
| 2014/0071793 A1 | 3/2014 | Riedl et al. | |

FOREIGN PATENT DOCUMENTS

| | | |
|---|---|---|
| EP | 3 012 962 A1 | 4/2016 |
| WO | WO 2015166173 A2 | 11/2015 |

OTHER PUBLICATIONS

French Search Report dated Feb. 17, 2017 in FR 1655822 filed on Jun. 22, 2016.

* cited by examiner

METHOD FOR ESTIMATING THE POSITION AND SPEED OF THE ROTOR OF AN ALTERNATING CURRENT MACHINE FOR A MOTOR VEHICLE, AND CORRESPONDING SYSTEM

The technical field of the invention is the control of electric machines for a motor vehicle, and more particularly the estimation of quantities involved in such controls.

The sophisticated control strategies for electric machines require a precise knowledge of the position and/or of the speed of the rotor. These mechanical quantities are traditionally measured.

With such a control structure, the dynamic performance levels of the alternating current machines are better than those of the direct current machines. On the other hand, powerful digital computers, power components with high switching frequencies and some additional sensors connected to the engine shaft linked to the rotor are required for such sophisticated control.

The use of mechanical sensors, for measuring the position and/or the speed of the rotor, in a control structure of the electric machines creates a number of constraints, among which it is possible to cite the additional costs of the sensors and of their associated electronics, the bulk due to the installation of the sensors and the wiring thereof, the sensitivity of the sensors to their environment (temperature, noise, mechanical oscillations, electromagnetic compatibility, etc.) and the possibility of failure of a sensor or of one of its connections, which reduces the reliability of the system.

These constraints limit the use of the sensors, even make it impossible, in some applications. For that, there is an effort to replace the mechanical sensors which measure the position and the angular velocity of the rotor with estimation algorithms which estimate these quantities by using the measurements of the currents and of the voltages.

From the state of the art, the following documents are known.

The document US 2013/0289934A1 describes a method for estimating the flux of the stator from the signals of the voltage and of the currents of the machine, which are then used to estimate the rotor flux of the machine from the stator flux. The method also comprises the determination of the electrical angle and its derivative. This method applies only to a synchronous machine and cannot be transposed to wound rotor machines.

The document US 2007/0194742A1 describes the estimation of the flux without involving an observer in the proper sense of the term but rather with offset sinusoidal signals.

The document CN102983806 describes a simple technique for estimating the stator flux.

The document CN102437813 describes a method for working back to the angle and the speed of the rotor from the rotor flux, for a permanent magnet synchronous machine. Moreover, the teaching of the document involves an extensive use of physical filtering through an extraction of the fundamental of the voltage and current of the rotor.

The document EP3012962 describes a method for estimating the position for the wound rotor synchronous machine, from the estimation of the flux. In this method, it is necessary to know the inductances of phases and the mutual inductances between the stator and the rotor.

There is a need for a method for controlling an electrical machine that is an improvement over the existing methods, that can be applied to any type of alternating current machines (synchronous and asynchronous) and that can offer a greater robustness with respect to the parameters of the machine and with respect to measurement noises.

The subject of the invention is a method for estimating the position and the speed of the rotor of an alternating current machine for a motor vehicle. The method comprises the following steps:

the stator currents of the machine in the three-phase reference frame and the values of the stator voltages of the machine in the three-phase reference frame are determined, the components of the stator currents are determined in a two-phase reference frame as a function of the stator currents in the three-phase reference frame by Concordia transformation, the components of the stator voltages are determined in the two-phase reference frame as a function of the stator voltages in the three-phase reference frame by Concordia transformation, the speed of the rotor is determined iteratively as a function of the stator voltages in the two-phase reference frame and of setting parameters, the stator fluxes of the machine are determined in the two-phase reference frame as a function of the speed of the rotor and of rejection parameters, and the position of the rotor is determined as a function of the stator fluxes in the two-phase reference frame, of the stator currents in the two-phase reference frame and of the equivalent inductance.

The rejection parameters can be determined as a function of the stator resistance, of the stator currents in the two-phase reference frame, of the stator voltages in the two-phase reference frame and of setting parameters.

When the electric machine is of synchronous type, it is possible to set the equivalent inductance equal to the quadratic component of the inductance of the stator.

When the electric machine is of asynchronous type, it is possible to determine the equivalent inductance as a function of the mutual inductance, of the stator inductance and of the rotor inductance.

The electromagnetic torque can be determined as a function of the stator fluxes in the two-phase reference frame and of the stator currents in the two-phase reference frame.

Also subject of the invention is a system for estimating the position and the speed of the rotor of an alternating current machine for a motor vehicle. The system comprises a first means for determining the components of the stator currents in a two-phase reference frame as a function of the stator currents in the three-phase reference frame by Concordia transformation, a second means for determining the components of the stator voltages in the two-phase reference frame as a function of the stator voltages in the three-phase reference frame by Concordia transformation, a third means for determining, by iteration, the speed of the rotor as a function of the stator voltages in the two-phase reference frame, a means for estimating the stator fluxes in the two-phase reference frame as a function of the speed of the rotor, and of measurement noise and deviation rejection parameters deriving from a fourth means for determining said parameters, and a fifth means for determining the position of the rotor as a function of the stator fluxes in the two-phase reference frame, of the stator currents in the two-phase reference frame and of the equivalent inductance.

The fourth means is capable of determining the measurement noise and deviation rejection parameters as a function of the stator currents in the two-phase reference frame, of the stator voltages in the two-phase reference frame and of the speed of rotation of the rotor.

When the electric machine is of synchronous type, the equivalent inductance can be set equal to the quadratic component of the inductance of the stator.

When the electric machine is of asynchronous type, the equivalent inductance can be determined as a function of the mutual inductance, of the stator inductance and of the rotor inductance.

The estimation system can comprise a sixth means for determining the electromagnetic torque as a function of the stator fluxes in the two-phase reference frame and of the stator currents in the two-phase reference frame.

Figure 2:
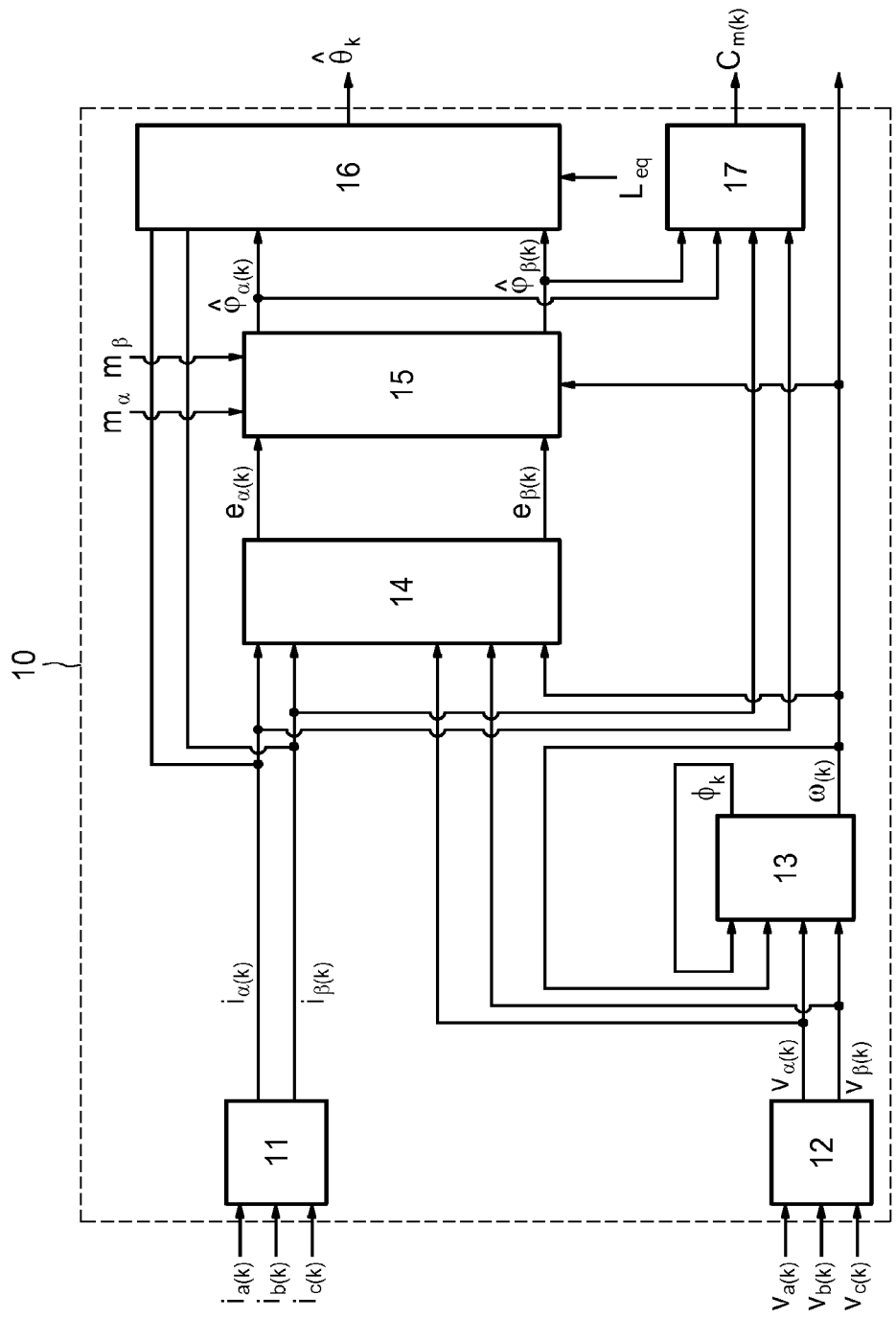

Other aims, features and advantages of the invention will become apparent on reading the following description, given purely as a nonlimiting example and with reference to the attached drawings in which:

FIG. 1 illustrates the main steps of an estimation method according to the invention, and FIG. 2 illustrates the main elements of an estimation system according to the invention.

The mathematical and physical principles that allow the determination of the position and of the speed of the rotor of an electric machine will now be described.

The stator currents $i_a$, $i_b$ and $i_c$ are measured. The voltages $v_a$, $v_b$ and $v_c$ are known at the control level.

From the three-phase voltages $v_a$, $v_b$, $v_c$, the two-phase voltages $v\alpha$, $v\beta$ are calculated by application of the following equation.

$$\begin{bmatrix} v_{\alpha(k)} \\ v_{\beta(k)} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_{a(k)} \\ v_{b(k)} \\ v_{c(k)} \end{bmatrix} \quad \text{(Eq. 1)}$$

In the case of a polyphase machine, the projection into a two-phase reference frame forms part of the art known to the person skilled in the art.

From the three-phase currents $i_a$, $i_b$, $i_c$, the two-phase currents $i_\alpha$, $i_\beta$ are calculated by application of the following equation.

$$\begin{bmatrix} i_{\alpha(k)} \\ i_{\beta(k)} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{a(k)} \\ i_{b(k)} \\ i_{c(k)} \end{bmatrix} \quad \text{(Eq. 2)}$$

It should be noted that these transformations are generally known as Concordia transformations of a three-phase reference frame integral to the stator to a two-phase reference frame integral to the stator also.

The speed $\omega(k)$ at the instant k is calculated iteratively, according to the following algorithm:

$\phi_{(0)}=0$ $\omega_{(0)}=0$ $\phi_{(k)} = \phi_{(k-1)} + T_s(\omega_{(k-1)} + m_\phi(v_{\alpha(k-1)} \sin \phi_{(k-1)} - v_{\beta(k-1)} \cos \phi_{(k-1)}))$ $\omega_{(k)} = \omega_{(k-1)} + m_\omega T_s(v_{\alpha(k)} \sin \phi_{(k)} - v_{\beta(k)} \cos \phi_{(k)})$ (Eq. 3)

with:

$m_\phi$ and $m_\omega$: setting parameters $T_s$: the sampling pitch, and $\Phi(0)$: a variable making it possible to estimate the speed (initialized at zero).

The equation (Eq. 3) ensures an estimation of the speed which can be set by the parameters $m_\phi$ and $m_\omega$. If the values of these parameters are high, the estimation is faster but noisy. If these values are low, the estimation converges less rapidly, but with less noise also.

The two quantities $e_{\alpha(k)}$ and $e_{\beta(k)}$ are defined by the following equations:

$e_{\alpha(k)} = v_{\alpha(k)} - R_s i_{\alpha(k)} + m_\alpha \cdot S_{\omega(k)}(v_{\beta(k)} - R_s i_{\beta(k)})$ $e_{\beta(k)} = v_{\beta(k)} - R_s i_{\beta(k)} + m_\beta \cdot S_{\omega(k)}(v_{\alpha(k)} - R_s i_{\alpha(k)})$ (Eq. 4)

with:

$S_{\omega(k)}=1$ if $\omega_{(k)}>0$ $S_{\omega(k)}=0$ if $\omega_{(k)}=0$ $S_{\omega(k)}=-1$ if $\omega_{(k)}<0$ $0 < m_\alpha, m_\beta < 1$ (Eq. 5)

$R_s$: the stator resistance

Generally, the following values are chosen for the two quantities $e_{\alpha(k)}$ and $e_{\beta(k)}$:

$m_\alpha = m_\beta = 0.3$ (Eq. 6)

The stator fluxes $\hat{\psi}_{\alpha(k)}$, $\hat{\psi}_{\beta(k)}$ in the two-phase reference frame are estimated from the following equations:

$$\hat{\psi}_{\alpha(k)} = \hat{\psi}_{\alpha(k-1)} + \frac{T_s}{2}(e_{\alpha(k)} + e_{\alpha(k-1)}) - m_\alpha \cdot S_{\omega(k)} \cdot \omega_{(k)} \cdot \frac{T_s}{2}(\hat{\psi}_{\alpha(k)} + \hat{\psi}_{\alpha(k-1)}) \quad \text{(Eq. 7)}$$

$$\hat{\psi}_{\beta(k)} = \hat{\psi}_{\beta(k-1)} + \frac{T_s}{2}(e_{\beta(k)} + e_{\beta(k-1)}) - m_\beta \cdot S_{\omega(k)} \cdot \omega_{(k)} \cdot \frac{T_s}{2}(\hat{\psi}_{\beta(k)} + \hat{\psi}_{\beta(k-1)})$$

By using the equation (Eq. 7), there is an assurance that the estimation of the fluxes is robust with respect to the noises and deviations produced by the sensors. The parameters $m_\alpha$ and $m_\beta$ are chosen so as to ensure the speed of convergence and the rejection of the disturbances (noises, deviations, etc.). If these two parameters are at zero, no filtering of the disturbances is performed and the estimation risks not converging. If they are at 1, there is an assurance of good filtering and rejection of disturbance but at the risk of seeing a static error appear.

The values lying between 0.2 and 0.7 ensure a good estimation quality.

Moreover, the equation (Eq. 7) is more stable than the estimation proposed in the prior art.

The position $\hat{\theta}_{(k)}$ is estimated from the fluxes estimated by application of the following equation:

$$\hat{\theta}_{(k)} = \operatorname{atan}\left(\frac{\hat{\psi}_{\beta(k)} - L_{eq} i_{\beta(k)}}{\hat{\psi}_{\alpha(k)} - L_{eq} i_{\alpha(k)}}\right) \quad \text{(Eq. 8)}$$

For the synchronous machines, the equivalent inductance $L_{eq}$ is replaced by the quadratic component of the inductance of the stator ($L_q$)

$$L_{eq}=L_q \quad \text{(Eq. 9)}$$

For the asynchronous machines, the equivalent inductance $L_{eq}$ is replaced by the transient inductance of the stator:

$$L_{eq} = L_s - \frac{M^2}{L_s L_r} \quad \text{(Eq. 10)}$$

with:
$L_s$: the stator inductance,
$L_r$: the rotor inductance, and
M: the mutual inductance between stator and rotor in an asynchronous machine.

The electromagnetic torque $C_{m(k)}$ can be estimated from the estimated fluxes and the currents by application of the following equation:

$$C_{m(k)} = \hat{\psi}_{\alpha(k)} i_{\beta(k)} - \hat{\psi}_{\beta(k)} i_{\alpha(k)} \quad \text{(Eq. 11)}$$

There now follows a description of the main steps of a method for estimating the position and the speed of the rotor of an alternating current machine, from the knowledge of the stator currents ($i_a$, $i_b$, $i_c$), of the stator voltages ($v_a$, $v_b$, $v_c$), of the stator resistance and of the equivalent inductance $L_{eq}$. These steps are illustrated by FIG. 1.

During a first step, the stator currents and the stator voltages are determined in the three-phase reference frame. It should be noted that the stator voltages can be received directly from a control means of the electric machine.

During a second step 2, the components of the stator currents are determined in a two-phase reference frame as a function of the stator currents in the three-phase reference frame by application of the equation 1 and the components of the stator voltages are determined in the two-phase reference frame as a function of the stator voltages in the three-phase reference frame by application of the equation 2.

During a third step 3, the speed of the rotor is determined as a function of the stator voltages in the two-phase reference frame by application of the equation Eq. 3.

During a fourth step 4, the stator fluxes are determined in the two-phase reference frame as a function of the speed of the rotor, of the stator resistance, and of the stator currents and voltages in the two-phase reference frame by application of the equation Eq. 7 in combination with the equations Eq. 4 to Eq. 6. This estimation makes it possible to reject the measurement noises and the deviations on the current sensors, through the two parameters defined by the equation Eq. 4. This estimation is independent of the type of the machine used.

During a fifth step 5, the position of the rotor is determined as a function of the stator fluxes in the two-phase reference frame, of the stator currents in the two-phase reference frame and of the equivalent inductance by application of the equation Eq. 8.

If the electric machine is of synchronous type, the equivalent inductance is set equal to the quadratic component of the inductance of the stator.

If the electric machine is of asynchronous type, the equivalent inductance is determined as a function of the mutual inductance, of the stator inductance and of the rotor inductance by application of the equation Eq. 10.

Finally, the electromagnetic torque is determined as a function of the stator fluxes in the two-phase reference frame and of the stator currents in the two-phase reference frame by application of the equation Eq. 11.

There now follows a description of the main elements of a system for estimating the position and the speed of the rotor of an alternating current machine, from the knowledge of the stator currents ($i_a$, $i_b$, $i_c$), of the stator voltages ($v_a$, $v_b$, $v_c$), of the stator resistance and of the equivalent inductance $L_{eq}$. These elements are illustrated by FIG. 2.

A first determination means 11 determines the components of the stator currents in a two-phase reference frame as a function of the stator currents in the three-phase reference frame by application of the equation 1.

A second determination means 12 determines the components of the stator voltages in the two-phase reference frame as a function of the stator voltages in the three-phase reference frame by application of the equation 2.

A third determination means 13 determines, by iteration, the speed of the rotor as a function of the stator voltages in the two-phase reference frame by application of the equation Eq. 3.

An estimation means 15 estimates the stator fluxes in the two-phase reference frame as a function of the speed of the rotor, of the stator resistance and of the stator currents and voltages in the two-phase reference frame by application of the equation Eq. 7 in combination with the equations Eq. 4 to Eq. 6. More specifically, a fourth determination means 14 determines measurement noise and deviation rejection parameters as a function of the stator currents in the two-phase reference frame, of the stator voltages in the two-phase reference frame, of the stator resistance and of the speed of rotation of the rotor by application of the equations Eq. 4 to Eq. 6, and the estimation means 15 estimates the stator fluxes as a function of the rejection parameters determined by the fourth determination means, and as a function of the speed of the rotor determined by the third means.

A fifth determination means 16 determines the position of the rotor as a function of the stator fluxes in the two-phase reference frame, of the stator currents in the two-phase reference frame and of the equivalent inductance by application of the equation Eq. 8.

If the electric machine is of synchronous type, the equivalent inductance is set equal to the quadratic component of the inductance of the stator.

If the electric machine is of asynchronous type, a determination means not illustrated in FIG. 2 determines the equivalent inductance as a function of the mutual inductance, of the stator inductance and of the rotor inductance by application of the equation Eq. 10.

Finally, a sixth determination means 17 determines also the electromagnetic torque as a function of the stator fluxes in the two-phase reference frame and of the stator currents in the two-phase reference frame by application of the equation Eq. 11.

The invention claimed is:
1. A method for estimating a position and the speed of the rotor of an alternating current machine for a motor vehicle, characterized in that it comprises the following steps:
the stator currents of the machine in the three-phase reference frame and the values of the stator voltages of the machine in the three-phase reference frame are measured,
the components of the stator currents are determined in a two-phase reference frame as a function of the stator currents in the three-phase reference frame by Concordia transformation,
the components of the stator voltages are determined in the two-phase reference frame as a function of the stator voltages in the three-phase reference frame by Concordia transformation, the speed of the rotor is determined iteratively as a function of the stator voltages in the two-phase reference frame and of setting parameters, the stator fluxes of the machine are determined in the two-phase reference frame as a function of the speed of the rotor and of rejection parameters, and the position of the rotor is determined as a function of the stator fluxes in the two-phase reference frame, of the stator currents in the two-phase reference frame and of the equivalent inductance.

2. The estimation method as claimed in claim 1, in which the rejection parameters are determined as a function of the stator resistance, of the stator currents in the two-phase reference frame, of the stator voltages in the two-phase reference frame and of setting parameters.

3. The estimation method as claimed in claim 1, in which, when the electric machine is of synchronous type, the equivalent inductance is set equal to the quadratic component of the inductance of the stator.

4. The estimation method as claimed in claim 1, in which, when the electric machine is asynchronous type, the equivalent inductance is determined as a function of the mutual inductance, of the stator inductance and of the rotor inductance.

5. The estimation method as claimed in claim 1, in which the electromagnetic torque is determined as a function of the stator fluxes in the two-phase reference frame and of the stator currents in the two-phase reference frame.

6. A system for estimating the position and the speed of the rotor of an alternating current machine for a motor vehicle, characterized in that it comprises a first means for determining the components of the stator currents in a two-phase reference frame as a function of the stator currents in the three-phase reference frame by Concordia transformation, a second means for determining the components of the stator voltages in the two-phase reference frame as a function of the stator voltages in the three-phase reference frame by Concordia transformation, a third means for determining, by iteration, the speed of the rotor as a function of the stator voltages in the two-phase reference frame, a means for estimating the stator fluxes in the two-phase reference frame as a function of the speed of the rotor, and of measurement noise and deviation rejection parameters deriving from a fourth means for determining said parameters, a fifth means for determining the position of the rotor as a function of the stator fluxes in the two-phase reference frame, of the stator currents in the two-phase reference frame and of the equivalent inductance.

7. The estimation system as claimed in claim 6, in which the fourth determination means is capable of determining the measurement noise and deviation rejection parameters as a function of the stator currents in the two-phase reference frame, of the stator voltages in the two-phase reference frame and of the speed of rotation of the rotor.

8. The estimation system as claimed in claim 6, in which, when the electric machine is of synchronous type, the equivalent inductance is set equal to the quadratic component of the inductance of the stator.

9. The estimation system as claimed in claim 6, in which, when the electric machine is of asynchronous type, a determination means determines the equivalent inductance as a function of the mutual inductance, of the stator inductance and of the rotor inductance.

10. The estimation system as claimed in claim 6, comprising a sixth means for determining the electromagnetic torque as a function of the stator fluxes in the two-phase reference frame and of the stator currents in the two-phase reference frame.

* * * * *